United States Patent [19]
de Heus et al.

[11] Patent Number: 5,390,354
[45] Date of Patent: Feb. 14, 1995

[54] COMPUTERIZED DIRECTORY PAGINATION SYSTEM AND METHOD

[75] Inventors: Ruud de Heus, Amsterdam; Stephen Randall, JT Hilersum, both of Netherlands; W. L. McDowell, Bedford, United Kingdom

[73] Assignee: ITT Corporation, Secaucus, N.J.

[21] Appl. No.: 670,255

[22] Filed: Mar. 15, 1991

[51] Int. Cl.6 .................................................. G06F 3/14
[52] U.S. Cl. .................................... 395/800; 395/148; 364/DIG. 2; 364/943; 364/162; 364/162.3; 364/419
[58] Field of Search ............... 395/600, 800, 144–148; 364/419

[56] References Cited

U.S. PATENT DOCUMENTS

| | | | |
|---|---|---|---|
| 4,498,150 | 2/1985 | Gaudet et al. | 396/117 |
| 4,539,653 | 9/1985 | Bartlett et al. | 364/900 |
| 4,651,278 | 3/1987 | Herzog et al. | 364/900 |
| 4,896,289 | 1/1990 | Svinicki et al. | 395/575 |
| 4,897,780 | 1/1990 | Lakness | 364/200 |
| 4,939,670 | 7/1990 | Freiman et al. | 364/900 |
| 4,996,662 | 2/1991 | Cooper et al. | 364/900 |
| 4,996,665 | 2/1991 | Nomura | 364/900 |
| 5,068,809 | 11/1991 | Verhalst et al. | 395/145 |
| 5,113,488 | 5/1992 | Bischel et al. | 395/117 |
| 5,133,051 | 7/1992 | Handley | 395/148 |
| 5,138,711 | 8/1992 | Miyoshi et al. | 395/600 |
| 5,140,676 | 8/1992 | Langelaan | 395/148 |
| 5,142,620 | 8/1992 | Watanabe et al. | 395/148 |
| 5,181,162 | 1/1993 | Smith et al. | 395/600 |
| 5,197,121 | 3/1993 | Miyoshi et al. | 395/146 |
| 5,197,122 | 3/1993 | Miyoshi et al. | 395/146 |
| 5,204,946 | 4/1993 | Shimamura | 395/147 |
| 5,274,757 | 12/1993 | Miyoshi et al. | 395/146 |
| 5,287,443 | 2/1994 | Mameda et al. | 395/146 |

OTHER PUBLICATIONS

Aldus PageMaker User Manual.
Aldus Corporation, Dec., 1987 pp (2-11)-(2-18); (13-19)-(3-21); (4-14)-(4-21); (5-3)-(5—5).

Primary Examiner—Alyssa H. Bowler
Assistant Examiner—Mehmet Geckil
Attorney, Agent, or Firm—White & Case

[57] ABSTRACT

A fully automatic computerized pagination system and method for paginating printed directories is provided. The system and method use a computer process which comprises a sequence of sorting operations which sort and position the entry items based on specific parameters relating to the size, shape, type and page format directory rules. The sorting operations are performed on the input data automatically and in sequential phases of a programmed sequence, so that when the operations are finished an entire paginated directory is produced.

4 Claims, 7 Drawing Sheets

COMPUTERIZED DIRECTORY PAGINATION SYSTEM AND METHOD

BACKGROUND OF THE INVENTION

The present invention concerns a computerized system and method for paginating printed directories. Typically pages to be reproduced by printing contain several items of different types, such as editorial text, diagrams, advertising, lists, tables, pictures, and so on which must all be fitted into the rigid two-dimensional format of the page. There are usually fixed rules, guidelines or a recommended "house-style" to control the positioning and formatting of each item on the page. In the past, pagination was a manual process, but now with the help of computers it is being automated. In newspapers, for example, software has been developed to allow the pagination and formatting to be done by computer page-by-page. This invention is directed to special problems of directory or catalogue composition.

Telephone directories present complex problems related to the placing of advertisements within certain classifications and with the serial positioning extending across many pages of the complete directory. Two alternative approaches of paginating such directories with computer assistance are generally known to the art. The example of a "Yellow Pages" telephone directory will be used to illustrate these prior art alternatives.

This first approach consists of preparing an exhaustive list of all allowable patterns within the rules or "house style" of the user or publisher. The computer program scrolls through the incoming data to find the best fit for each page. The best fit is usually specified as minimum waste or filler. For example, the page may consist of four vertical columns. Display advertising may be one sixth, a third, half or two-thirds of the area of the page and may extend across one, two, three or all four columns the full length of the page in any number of the columns or for any portion of their length. The directory will also contain listings, names and addresses of telephone subscribers, plus specialist items marking the beginning of a new business classification, e.g., "Transport". All of these entries must be positioned in the correct sequence.

The raw material is accumulated in a computer data file in a basic sequence of classifications with the listings and advertising within each classification also in sequence. The first approach, referred to here as the Pattern Matching Approach, takes this information and, on a page-by-page basis, organizes it into what may be many hundreds of alternative page layout patterns to find the one that leads to the least waste. Very often the data does not fit exactly in the page if all the rules are followed and so gaps appear between some of the items. These gaps, whether they are left empty or filled with some stock message, are waste as far as book production costs are concerned.

The disadvantages of this matching approach are (1) lack of flexibility, since any change in the range of book items, the page format or the rules requires that the process be completely redone; and (2) the process uses substantial computer time and may need a long batch run of many hours for a 2000 page directory. The Pattern Matching pagination program is therefore too cumbersome and expensive to use as a modelling tool to preview books at various stages of assembly or, for example, to measure the costs of various options on rules and items.

As an alternative to the Pattern Matching Approach other systems use a rule-based, penalty-point scoring system. Such a system tries all the possible arrangements of entries and assigns rule-based penalty points to each arrangement based on the extent of its deviation from the rules. The house style rules are used to develop the penalty-point scoring system. The best arrangement is selected based on a minimum number of penalty points. This type of system in practice, however, usually requires manual intervention to inspect decisions made by the software and to manually select the final arrangement in difficult cases.

The Penalty-Point System involves the management of a very complex set of data files which results in poor performance in terms of time and computer resources. Each new feature or feature change requires reprogramming. Furthermore, the output of the Penalty-Point system is variable in terms of strict adherence to the rules as it depends on human interventions made during each run.

This invention provides a computer process and system for paginating directories and similar publications which overcomes the problems of the Pattern Matching and Penalty-Point Systems of the prior art.

SUMMARY OF THE INVENTION

The present invention concerns a computer-based automated pagination system which can be used for any page format, any type or number of rules and any type of item to be positioned on a page. The invention can be used to paginate any printed directory such as a telephone, membership directory, art or stamp catalogue, etc. The system permits changes without programming intervention and can be run on a personal computer. The software for the computer process of the invention may be written in any computer language.

The core of the invention is the "pagination" process which comprises a sequence of simple sorting operations which can be processed at extremely high speed. The pagination process applies specific rules on the size, shape and permitted page position of items in successive cycles until the optimal result is achieved. The content of each item is not the subject of any rule or sorting in this process.

The sorting tasks or operations are split into groups known as "phases" which are performed in sequence. The type of catalogue or directory product being produced determines how many phases are needed and what sorting operations are needed in each phase.

As an aid to the efficient general application of the process and system certain supporting computer programs prepare or process the data for further processing in the pagination process and also perform post-pagination operations leading to final page image or typesetting output.

DESCRIPTION OF INVENTION

The present invention is a high-performance and fully automated page make-up system which ensures the most economic use of paper and printing given strict adherence to the house-style rules. The system provides for complete integration of digital graphics and enables electronic transmission of final pages for distributed printing operations.

The system has a high degree of flexibility and efficiency so as to cope with a wide variety of directory formats. To this end, a set of parameters is used to define the pagination rules according to the specifications of the book directory to be produced. On the basis of these parameters, the pagination process optimizes the page layout, arranging the entries in the minimum permissible space.

Figure 1:
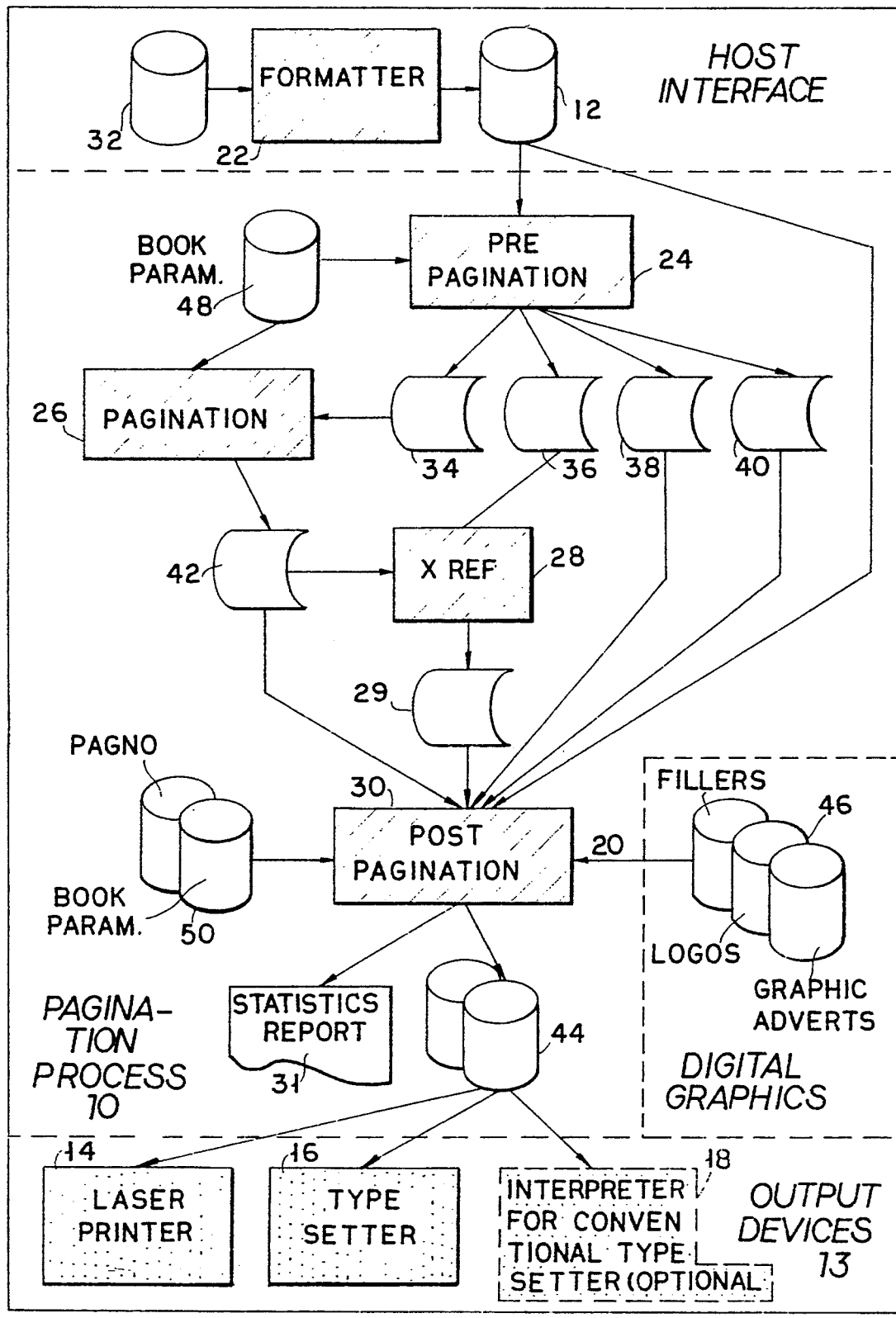
FIG. 1: diagrammatically depicts the architecture of the Pagination system.

Referring to FIG. 1, the system consists of a central pagination process be which accepts as input galley entries 12 produced by a Publishing System. The system works out an optimal page layout according to a set of pagination parameters 48, and generates the final output format 44 for printing.

The function of the Pagination System is to position all items on the page as specified by the pagination rules. As a by-product the system also generates a number of extra items for incorporation within the page such as cross-references, "see next page" and heading continuations. The actual process of merging the images of the in-column items and out-column material (including digital graphics data) to form a complete page image may be implemented either in the Host Publishing System or in a Digital Graphics Sub-system or in an intelligent image-setting device.

The input file for the pagination process 12 is created from the Host Publishing System, using the system specific file format. It consists of all entries (for example, heading, in-column text and display entry identification) related to the book to be produced in one single stream, ordered by heading and alphabetically by customer name within each heading. Each entry should be provided with typographic information for pagination and typesetting. An entry in this context refers to a single entity listed in the directory. It could be a heading, a listing or any in-column or out-of-column advertisement.

The final book layout, also created using the system's specific file format, can be printed directly on output devices 14 and 16. The output devices preferably use Adobe ™ Postscript software. If a non-PostScript output device is used, then a simple interpreter program 18 is required for the file format conversion.

The system's specific file format should be a device-independent file format to fully take advantage of the constant improvement of typesetting technology. The file format consists of a set of high level commands to specify typographic information, e.g., vertical and horizontal positioning, letter type and size, lines and boxes. These commands are combined with galley entries into a single stream that can be interpreted and processed by the typesetter software used in conjunction with the typesetting equipment.

The system files can be directly processed on a suitable output device 14 and 16, each system command being defined in native Page Description Language ("PDL") commands in a "Prologue" file to be loaded on the device prior to printing or typesetting. The invention is presently implemented using PostScript as the PDL but any other equivalent PDL may be used. Graphic materials that conform to the Encapsulated PostScript File Standard ("EPFS") can be merged 20 into the paginated pages just before being sent to the output device.

The output devices consist of laser printers 14, typesetters 16 or other image output devices. Laser printers print, for example, at resolutions of 600 dots per inch ("dpi"), while the typesetters can produce high resolution output, e.g., 1200 dpi or more. The destination of the output will determine which type of device will be used: a) Laser printers can be used for galley proof printing or simulation runs; b) typesetters can be used for final book production; c) PostScript display terminals can be used for visualization of the book layout during production.

Note that the input file to the pagination process 12 is also created using the system's file format, and is directly printable as un-paginated pages for proof reading of page content if required.

System files can also be output on other conventional typesetters by converting the file content into their corresponding native language. In such an embodiment, an interpreter program for each specific typesetter 18 would be required.

The system consists of the following program modules: data formatting 22; pre-pagination 24; pagination 26; cross-reference 28; and post-pagination 30.

The data formatting module 22 is a host system-dependent utility program that converts host data 32 into a generic, host-independent, input data format 12. The input data 12 defines each book item by specifying, for example, its type, height and width.

The pre-pagination module 24, prepares the input data 12 for later use by the other modules by creating intermediate data files, 34, 36, 38 and 40.

Intermediate data file 34 is an abbreviated form of file 12. It contains codes that indicate the dimension of each book item. These codes are generic in that they are used for any type of book. The data contained in File 34 will be used by the pagination module File 36 contains all information, such as identification codes and size, relating to display advertisements. The file 36 data is used by the cross-reference module 28.

File 38 is an abbreviated form of file 12 and contains generic codes that indicate the initial leading of each listing item. Leading refers to the vertical separation between items in each column. The amount is set by each publisher or systems user as an ideal but, can be modified in the interests of copy fitting efficiency. The file 38 data is used by the Post Pagination Module 30.

File 40 is an abbreviated form of file 12 based on generic codes that indicate the body height of each listing item. These file 40 data is used by the post-pagination module 30.

The Pagination module 26 carries out the actual pagination process for a given book made up of different items. For instance, in a particular document pagination may be defined as the assignment of a location for each item in a given book. The two main item types are display advertisements and listing material.

Listing material can be further subdivided into the following categories: Header listing, the first item of a new class; Free listing, an in-column text item; Anchor listing, in column text item which refers to a given display advertisement (also known as a reference or contract listing).

Apart from the obvious page boundaries the system will accept any dimensions for display advertisements and listing material. This information is extracted from the so-called unpaginated tabulated data file which was made up by the previous module in the system.

After pagination is carried out, the so-called paginated tabulated data file 42 is made. This file serves as information to the other modules in the system on how to make the finished paginated product in a human-readable form.

After the Pagination module has been executed another utility, XREF, the Cross-referencing module 28, checks the relationships between display advertisements and their corresponding reference listings. The Cross-referencing module 28 may also provide useful statistics on the relative positioning of display advertisements and their reference listings. These statistics are stored in file 29 and are used by the Post-Pagination module 30 to generate a statistics report 31. It should be noted that the Cross-referencing module 28 is not required for a white page telephone book pagination system.

The Post-Pagination 30 module produces the final book appearance using the results 42 given by the Pagination module 26. This module prepares a file 44 containing all of the book items with all of the textual content. Display advertisements may be generated by including their digitized graphic instructions 46. Alternatively, spaces may be generated if desired or if the graphic information does not yet exist. The same system applies to logos and fillers. Once processing by the post-pagination module is completed the final output file 44 is then ready to be sent to the output devices 14, 16 and 18.

In order to allow the Pagination module to cope with different pagination methods, a parameter file 48 and 50 is constructed for each system which defines the page layout and pagination method to be used in each instance.

The layout parameters define the general appearance or physical characteristics of a book page or sections of the book and are used by all of the system modules. The layout parameters are used for the formatting of galley entries into columns and pages during the preparation of the final book layout. These parameters may define, for example: the height of a column (specified in pica point size); the number of columns per page, e.g., 1–7; the leading height of display advertisements; the height of continuation markers; the maximum display area per page; the minimum listing height in each column; standard leading between advertisements (in pica point size); page headers; galley stretch factor; maximum filler; minimum filler; advertisement processing; and, the applicable corner cutouts on a spread, etc.

The pagination parameters collectively define the pagination method and are only used by the pagination module. These parameters are used during the pagination process to achieve the desired "house style" by controlling the positioning of display entries, anchor listings and headings relative to the column and page boundaries These parameters may define, for example, in the case of telephone books: white page book with few display advertisements; white page book with special rule display advertisements; yellow page book with spread rule display advertisements; yellow page book with class rule display advertisements.

Examples of Pagination Parameters are: Sort to top, sort the display entries in each column with the largest entries at the top of the column; Sort to bottom; sort the display entries in each column with the largest entries at the bottom of the column; Sort to heading, sort the display entries in each column with the largest entries at the top of the column or immediately below its heading; Move to top, move all display entries to the top of the column without changing the ordering of display entries; Move to bottom, move all display entries to the bottom of the column without changing the ordering of display entries; Throw in trailing heading, force a column throw to prevent an occupied heading entry from becoming the last listing entry in a column; Throw on lone heading, force a column throw to prevent an empty heading entry from becoming isolated at the bottom of a column; Throw on billboard, prevent a billboard from occurring by throwing the display entry to the next page; Constrain contract listings, constrain contract listings to at least the same page opening as the corresponding display entry.

These parameters trigger the execution of basic routines to change the positioning of display ads which are loaded into an internal table. By combining the appropriate routines in pagination phases, the desired book layout can be achieved in 1 to 3 phases of sort procedures.

The pagination parameters can be seen as a set of boolean switches that enable the execution of a series of procedures in the module library. These procedures are used many times over by grouping the parameters together in so-called phases.

Each phase represents a single sweep through the pagination module. The first phase generally pre-sorts the display advertisements in order for them to be used in subsequent phases. After a phase has been carried out, a search is made to see if there are more pagination parameters to be processed or if the end of the process has been reached.

Each phase is used to add further refinements to the pagination output. A simple white page book will probably require only a single phase whereas a yellow page book will usually require two phases: one to sort the ads (i.e. area sort) and one to position the ads in the class boundaries (i.e. class sort). These two sorts cannot be carried out in one phase because the galley assignment is required between the area sort and the class sort.

Figure 2:
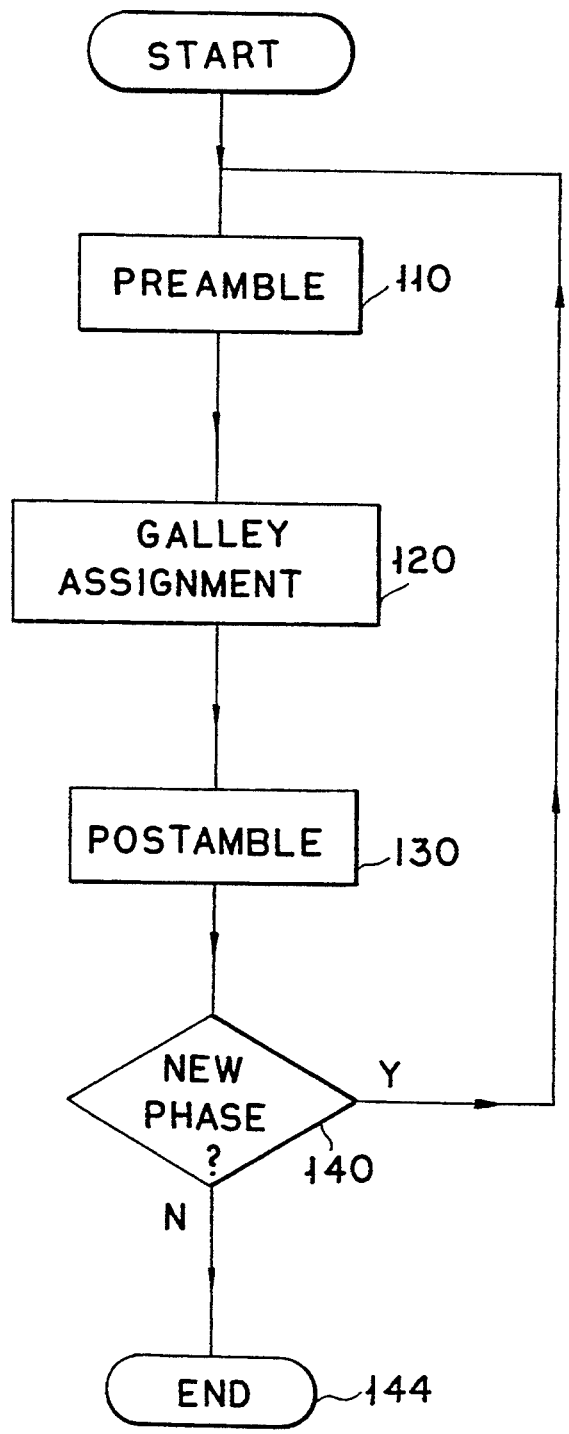
FIG. 2: diagrammatically depicts the parts of a phase of the Pagination module.

Referring to FIG. 2, each phase can be broken up into three parts: the Preamble 110; the Galley Assignment 120 and the Postamble 130. Due to the system of boolean switches it is not mandatory for all three parts to be used, however the Galley Assignment is always used.

The Preamble part 110 generally pre-sorts display advertisements for later use. Its use depends on the list of sorting tasks setup in the parameter file, 26, which in turn depends on the type of directory being processed.

Figure 3:
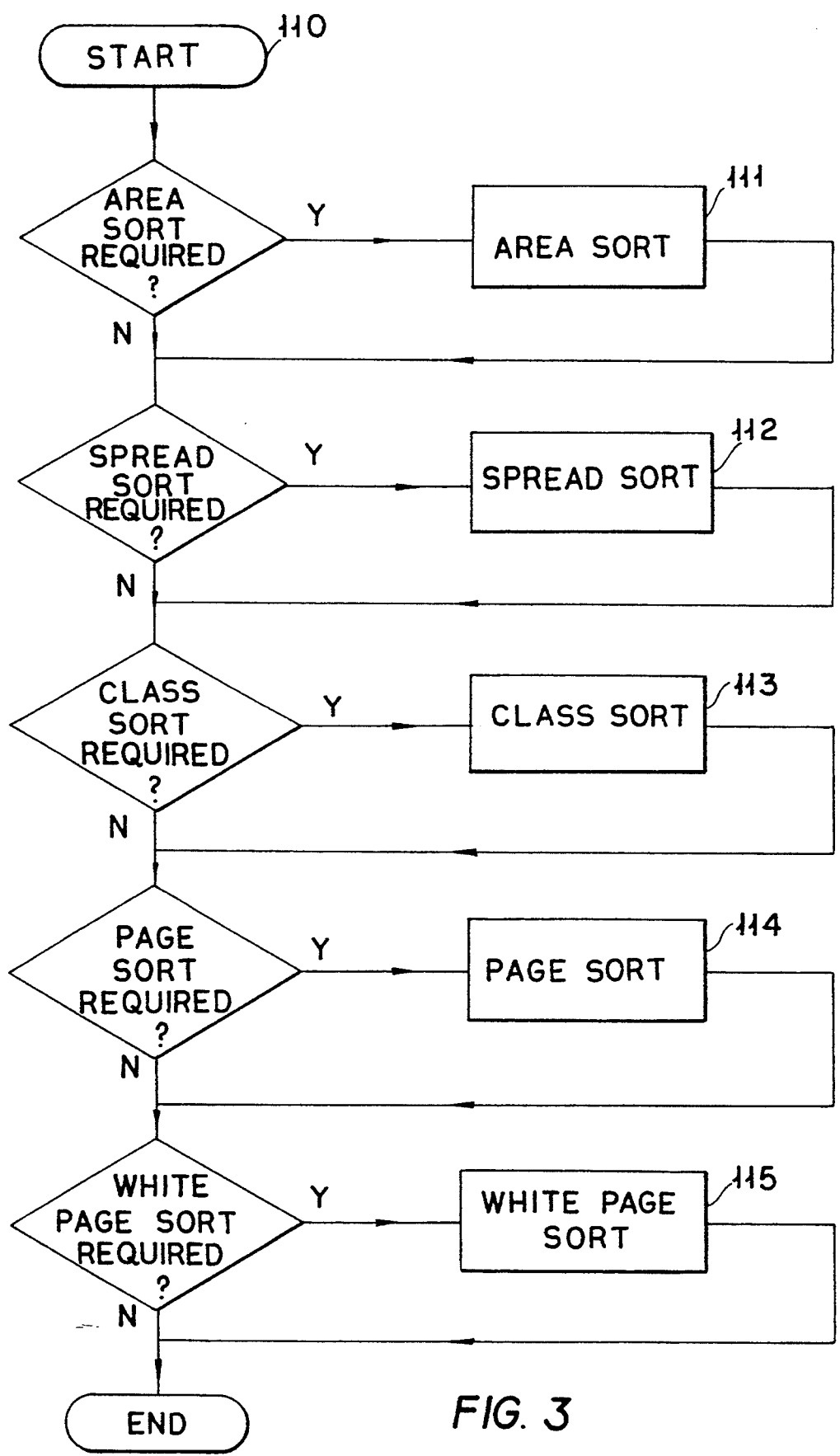
FIG. 3: diagrammatically depicts the sorts that may be carried out in the Preamble part of the phase of the Pagination module.

When using the appropriate parameters, any combination of the following sorts are carried out in the Preamble part, as depicted in FIG. 3: Area Sort 111; Spread Sort 112; Class Sort 113; Page Sort 114; and White Page Sort 115.

Figure 4:
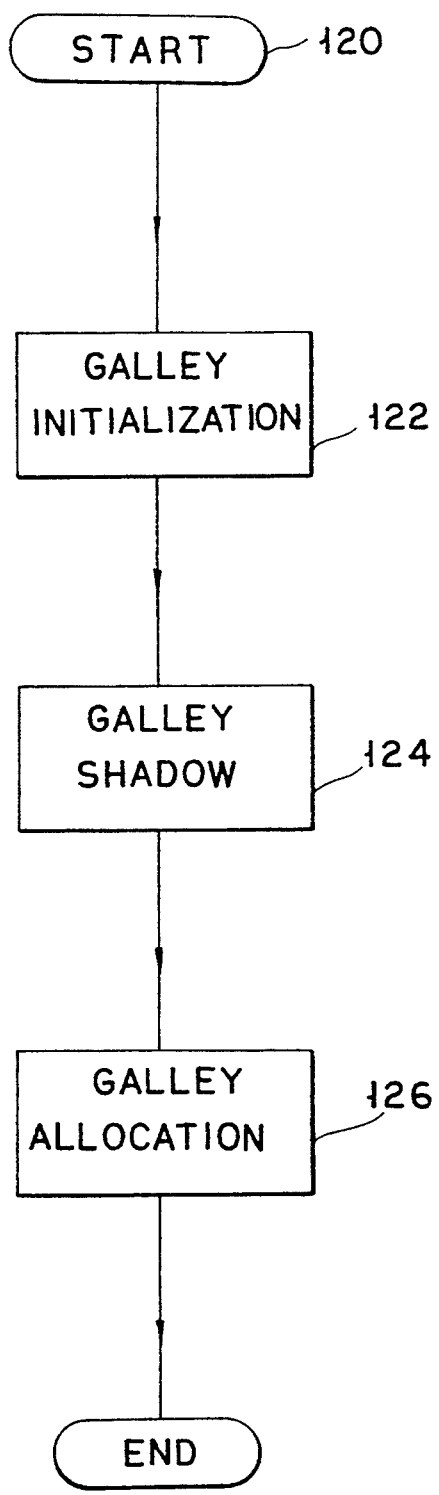
FIG. 4: depicts the subparts of the Galley Assignment part of the Pagination module.

In the Galley Assignment part 120 all the book items are assigned a galley location. Depending on the parameters used, it may assign listing material if the preamble or a previous phase has already taken care of the display advertisements. The Galley Assignment is subdivided into the following sub-parts, as depicted in FIG. 4: Galley Initialization 122; Galley Shadow 124; Galley Allocation 126.

Figure 5:
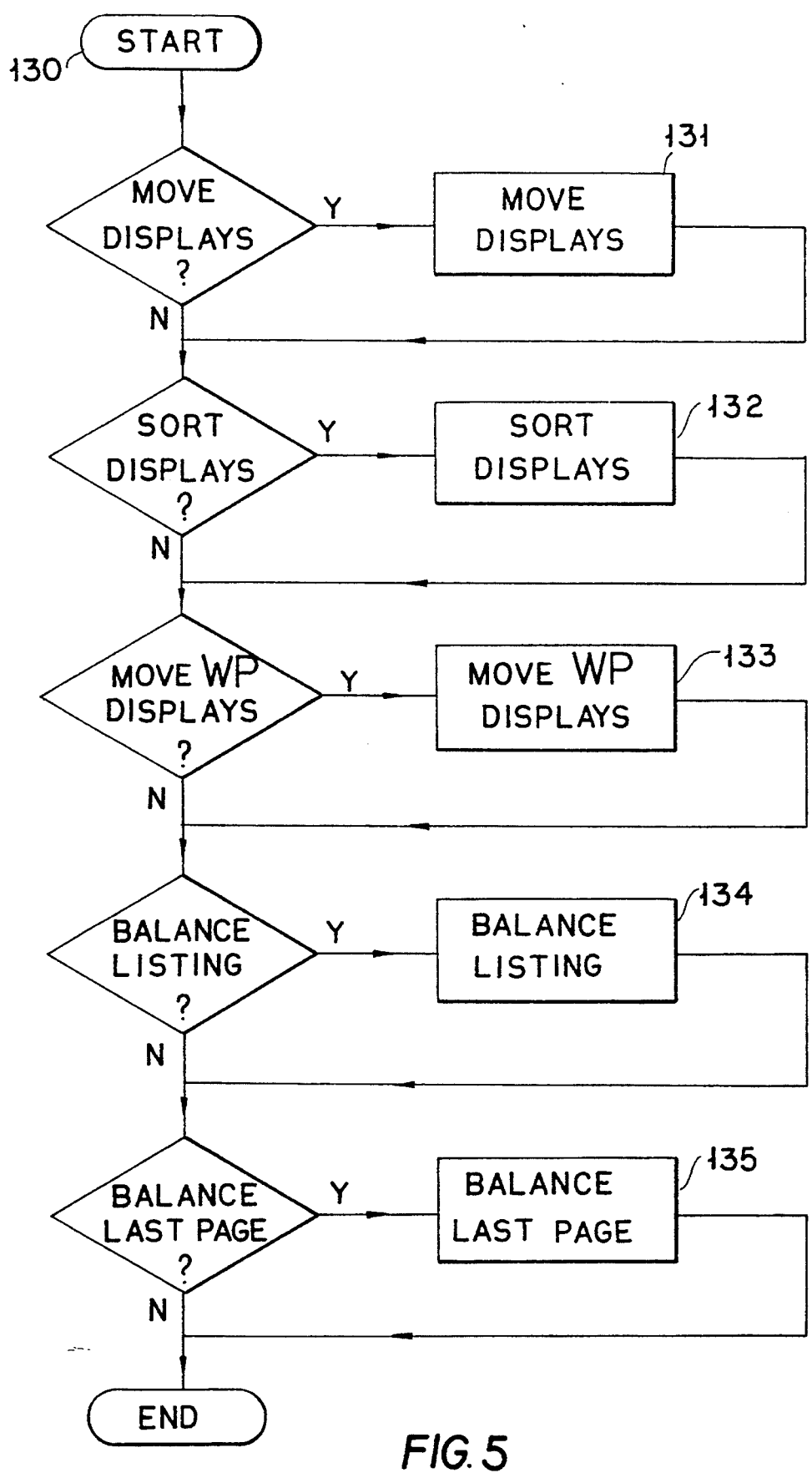
FIG. 5: diagrammatically depicts the actions carried out by the Postamble part of the Pagination module.

The Postamble, part 130, see FIG. 5, performs any remaining tasks in order to complete a particular phase. It is generally used in the last phase in order to improve the appearance of the book. If the appropriate parameters are used, any combination of the following actions are carried out, as depicted in FIG. 5: Move Displays 131; Sort Displays 132; Move WP Displays 133; Balance Listing 134; and Balance Last Page 135.

The various subparts and sorts of the Preamble, Galley Assignment and Postamble are discussed in more detail below.

Preamble.

Area Sort. In each class or heading, the display advertisements are sorted by descending area size and moved to the start of the heading. If two or more display advertisements of the same heading have the same area size, they are sorted in alphabetical order. This assures that display advertisements come before listing material and that the largest display advertisements are placed at the start of the heading. The Area Sort is often used in conjunction with the Class Sort. The Area Sort is performed in the first phase, the Class Sort in the second phase.

Spread Sort. In each class or heading, the display advertisements are sorted by descending order of width and within a particular width by descending order of height. They are then moved to the start of their spread. If two or more display advertisements of the same heading have the same width and height, they are sorted in alphabetical order. Care is also taken to make the total display area on the left and right page of a spread roughly equal.

Within each page, the outside galleys have a higher priority than the inside ones. This is also known as the outside-in-rule. This results in display advertisements being configured in a 'L' shape on left-hand pages and an inverse 'L' shape on right-hand pages.

Class Sort. The display advertisements are placed within the boundaries of their class. If a given class only starts on the second galley of a left-hand page, the display ads will not be allowed to precede this location. However, an attempt will always be made to achieve an 'L' shape configuration on a left-hand page and an inverse 'L' on a right-hand page. The pages are not balanced with display material as is the case with the spread rule but a maximum limit for the display area is given for a page. As with the Spread Sort described above, the 'outside-in' rule is in operation.

Page Sort. Each display advertisement is placed on the first available page. It is sorted to the left if on a left-hand page and to the right if on a right-hand page. This can be considered as a simple version of the Class Sort or even the Spread Sort, but for reasons of efficiency it has been made to be a separate case.

White Page Sort. This sort displays advertisements to a page which is as close as possible to the appropriate alphabetical text item. In a preferred embodiment of the invention there are only three types of display advertisements, each of which can only occur once on a page. If a particular display advertisement cannot be placed on a given page because one of the same type is already there, it is placed on the closest available page.

Galley Assignment.

Galley Initialization. After the Preamble 110 is carried out, the process continues with the galley assignment phase 120, as shown in FIG. 2. The galley assignment phase begins with initialization 122 which resets the available space for each galley of a given book. If the display advertisements have already been assigned a location by one of the sorts in the Preamble 110, only listing material need be considered in the Galley Allocation 126. If this is the case, the available space is further reduced by calculating the space taken up by the display advertisements. Corner cutouts are also calculated if given by the layout parameters in the parameter file.

Galley Shadow. This phase 124 is only applicable if display advertisements have already been assigned a location and if the appropriate parameter is used.

Shadow occurs when a display advertisement with height A, width x is located above another display advertisement with height B, width Y, which has a narrower width. Thus the top advertisement, item A, the bottom one, item B overhangs. In many house styles a rule exists which states that no listing material may be placed in this shadow area below the top advertisement. Thus the two items A and B must be treated as a single display advertisement (of width x and height $A+B$).

Galley Allocation. This phase 126 assigns a location for each item in the book. It also ensures that all items are kept in the correct relative order as given by the galley location.

Before an item can be assigned a galley location it must pass through a sequence of checks that are mostly parameter-driven. One implicit check is always carried out regardless of parameters.

This checks to ensure that a header item which marks the beginning of a classification must be followed by a least one subscriber listing.

The other checks are optional, they are as follows: Check Embedded Header, Check Position, Check Class, Check Display Area, Check Long Listing, Check Orphan, Check Billboard, Check Contract Listing, Check Listing Stretch, and Check Display Separation and are described briefly below.

Check Embedded Header. A header item is defined as being embedded when it is surrounded by display material of a previous class. This check procedure provides that a suitable location is found for the embedded header so that it is no longer embedded.

Check Position. This check ensures that the current position in the galley provides enough room for the current book item allowing for any shadow that may occur.

Check Class. If the current book item is a listing, this check ensures that there is still enough room in the galley for this listing and its class continuation message. The height of the item is given by the layout parameters.

Check Display. Area. If the current book item is a display advertisement, this check ensures that display material on the current book page does not exceed the limit given by the appropriate layout parameter.

Check Long Listing. If the current book item is part of a long listing broken up in several components, this check ensures that there is enough room in the current galley to hold a given minimum value. This value is defined by the layout parameters and prevents small stand-alone components from being placed in a galley.

Check Orphan. If the current book item is a free listing, this check ensures that a spread does not have just an anchor listing of a given class before starting a new class. If possible, this listing will be placed in the same galley as the lone anchor listing in order to prevent it from being an orphan.

Check Billboard. If the current book item comprises display advertisements, this check ensures that a page is not completely occupied by display material.

Check Contract Listing. If the current book items is a contract listing, this check ensures that the item is placed on a spread which does not come before that of the corresponding display advertisement.

Check Listing Stretch. If the current book item is listing material, this check ensures that it is placed in such a manner that all pages with display material of a given class have at least some listing material of the same class. Some classes have a large amount of display material and a very small amount of listing material. This would mean that some pages would only have display material. To prevent this happening, each page gets an equal proportion of listing material.

Check Display Separation. If the current book item is display material, this check ensures that it does not fall within the shadow of display material of a previous class. Note that the Galley Shadow applies only to listing material. After carrying out all checks in the Galley Assignment 120, the process continues with the Postamble 130 as shown in FIG. 2.

Postamble. The following Postamble actions, shown in FIG. 5, are generally used only in the last phase because they deal with the final touches to the process: Move Display 131, Sort Displays 132, Move WP Displays 133, Balance Listing 134 and Balance Last Page 135.

Move display. If the appropriate parameter is used, display advertisements are either moved to the top or bottom of their galley without changing their relative order.

Sort Displays. If the appropriate parameter is used, display advertisements are sorted by either descending or ascending width. Within a given width they are then sorted by descending height.

Move White Page Displays. This is generally used in conjunction with the White Page Sort which concerns only three types of display advertisements: display at top of page; display in middle of page; and display at bottom of page. The display advertisements at the top and bottom of the page have the same number of galleys as the page itself, whereas the middle display advertisements have 2 galleys less. All types are identified and placed at the correct position in the page.

Balance Listing. Some pages may have a galley containing more listing material than in the adjacent galley to the left or right. This presents a more "balanced" appearance by redistributing the listing over these galleys so that each galley has roughly the same amount of listing material.

Balance Last Page. Similar to the problem encountered in Balance Listing, the last page always presents an unbalanced appearance because there simply is not enough material to fill the page. Now all material, i.e., listing and display material is redistributed over the page so that each galley contains roughly the same amount of material. Note that if the last page only contains listing material, the Balance Listing discussed above will also perform the same job.

After all work is carried out in the Postamble 130, a check is made 140 to see if any other phases are needed, as shown in FIG. 2. If so, the cycle recommences again with the Preamble 110. If no other phases are needed the pagination process as a whole terminates 144.

Any computing environment known to the art may be used to implement this process and system. Preferably the system used will support a "C" language application; provide at least 100K of memory and have the necessary communication to the host publishing system and typesetting peripherals, to execute the software. Extra memory is required to store book data.

The system can also generate any book provided it is governed by rules concerning the book items. Telephone directories are the most obvious choice because they obey certain intransigent rules such as alphabetical listing items sorted by class and display ads sorted by class and dimension.

The following Examples 1-3 illustrate the operation of three different Pagination modules according to the invention for three different telephone directory formats. The Pagination modules operate on input file data generated by the Pre-Pagination module which places all of the entries in order by heading and alphabetically by customer name. The Pre-Pagination module performed prior to pagination, and the Cross-Referencing and Post-Pagination modules performed after pagination are not illustrated in these examples since their operation does not change significantly with the change in directory format.

EXAMPLE 1

This example illustrates an embodiment of the invention in which a white page telephone directory which consists solely of contract listings, i.e., name, address and telephone number of subscribers, is paginated in a single phase process. This single phase consists of only two sorts, The Galley Allocation sort in the Galley Assignment part followed by the Balance Last Page sort in the Postamble part.

The Galley Allocation sort assigns each listing to the first available location that has enough space to hold it. Since a white page book consists solely of listings and does not contain additional constraints on the listing material no other sorts are required in the Galley Assignment part.

After completion of the Galley Allocation the last page may have some columns without any listing material. In order to avoid such a situation in the finished product a Balance Last Page sort is performed as the only sort in the Postamble part of this single phase operation. This balancing operation takes place on the last page of the book only and ensures that each column of the last page contains approximately the same amount of material.

EXAMPLE 2

Figure 6:
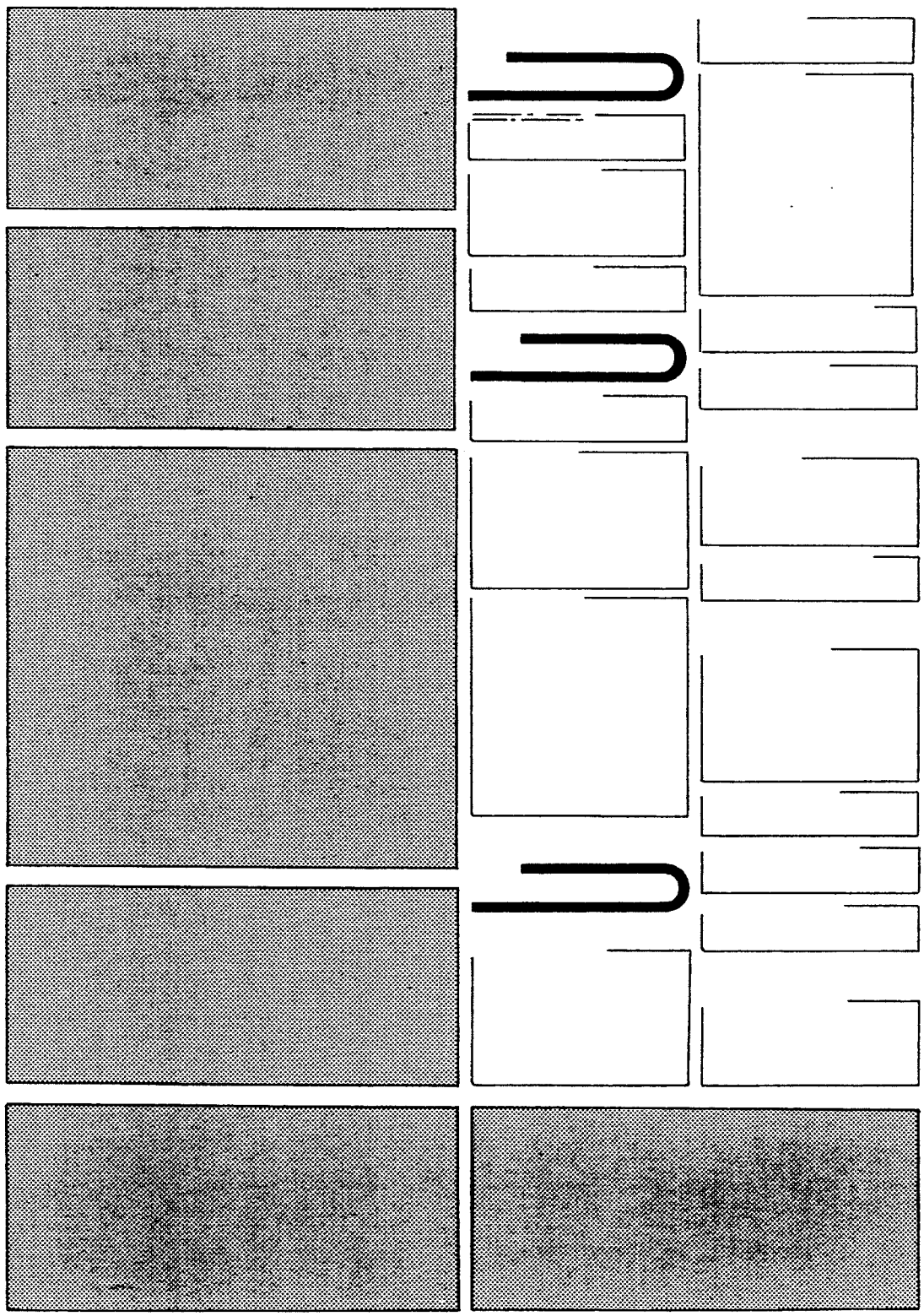
FIG. 6: shows a diagram of an L-shaped display format of a yellow page directory.

As the complexity of the page format, and the variety of page items or entries increase, the number of sorts and phases that are required to automatically paginate the directory also increase. In this example a yellow page directory containing contract listings and display ads of various sizes arranged according to house rules on the side and bottom of the page in an L-shaped format (see FIG. 6) is paginated in a two phase process as follows:

TABLE 1

| Sort | Part |
| --- | --- |
| Phase 1 | |
| Galley Allocation | Galley Assignment |
| Check Contract Listing | Galley Assignment |
| Check Billboard | Galley Assignment |
| Phase 2 | |
| Spread Sort | Preamble |
| Galley Allocation | Galley Assignment |
| Check Billboard | Galley Assignment |
| Check Contract Listings | Galley Assignment |
| Sort Displays to Bottom | Postamble |
| Move Displays to Bottom of Page | Postamble |
| Balance Listings | Postamble |
| Balance Last Page | Postamble |

Phase 1 begins with a Galley Allocation sort in order to assign each of the items, which in the case of yellow pages includes listings and display ads and filler material, to the first available location. Since additional conditions of entry placement exist for both contract listings and display ads, a sequence of parameter-driven check sub-routines specific for each type of item are performed as part of the Galley Allocation sort.

The Check Contract Listing sub-routine sort ensures that listings are not placed in any spread that is ahead of the spread that contains its associated display ad. The Check Billboard sub-routine ensures that a page is not entirely filled with display ads and that adequate space is left for listings. The completion of these sub-routines completes the Galley Allocation sort of Phase 1.

After the completion of Phase 1 rough pagination of the book has taken place with all the materials having been assigned a location. Even though all the material has been assigned a preliminary location, the display ads are not necessarily in an "L" shape configuration or on the same spread as its associated contract listing.

Phase 2 begins with a Preamble part Spread Sort which sorts display ads so that they appear on the same spread as their associated contract listings. The Spread Sort operates by assigning the display ad to the spread on which its associated listing is located. In this specific example the display ads on each page are also sorted so that they appear in an "L" shaped configuration on the page.

The Preamble part of Phase 2 is followed by the Galley Assignment part beginning with the Galley Allocation sort. The Galley Allocation sort in Phase 2 performs sorting operations on the material that has been preassigned locations in Phase 1 by reassigning entries to locations made available by the previous Spread sort. The Galley Allocation sort of Phase 2 is completed by Check Contract Listing and Check Billboard sub-routines as in Phase 1.

In order to complete Phase 2 and the pagination procedure, a Postamble procedure is performed. The Postamble part begins with a Move Displays to Bottom of Page sort which moves display ads to the bottom of each column without changing their relative order.

At this stage in the pagination process some columns on a page may have a different amount of listing material as compared to adjacent columns giving the pages an unbalanced appearance. To rectify such situations a Balance Listing sort is performed which redistributes the listing material over the columns by making multi-column stoppers.

The Postamble of Phase 2 and thus the pagination process is concluded with a Balance Last Page sort which ensures that all the columns of the last page of the book contain listing material. This balancing operation takes place on the last page of the book only and assigns listing material to each column of the last page so that each column contains approximately the same amount of material.

EXAMPLE 3

Figure 7:
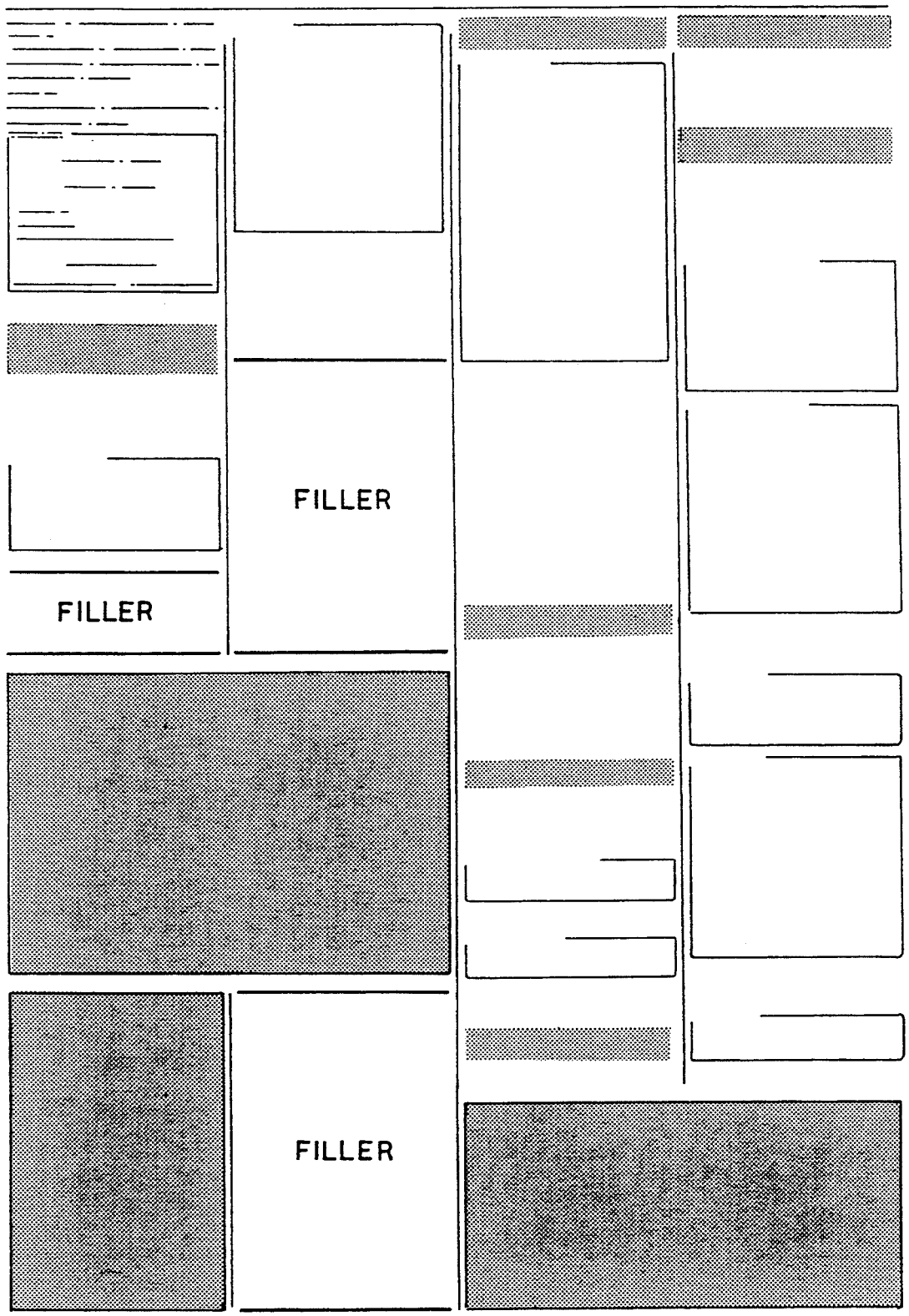
FIG. 7: shows a diagram of a yellow page directory without a specific page format which has been automatically paginated to attain a best fit.

This example illustrates the automated pagination of a yellow page directory that does not contain a specific page format (see. FIG. 7), such as that illustrated in Example 2. In this example the system arrives at a best fit according to the applicable house rules. Due to the large variety in the types and sizes of display advertisements, whose position on the page is not restricted to a format as the displays in the previous example, a greater number of sorts and phases is needed in order to automatically paginate with a minimum amount of filler space while complying with the applicable house rules. This automated process requires three phases as follows:

TABLE 2

| Sort | Part |
| --- | --- |
| Phase 1 | |
| Area Sort | Preamble |
| Galley Allocation | Galley Assignment |
| Check Embedded Header | Galley Assignment |
| Check Class | Galley Assignment |
| Check Shadow | Galley Assignment |
| Check Display Separation | Galley Assignment |
| Phase 2 | |
| Area Sort | Preamble |
| Class Sort | Preamble |
| Galley Shadow | Galley Assignment |
| Galley Allocation | Galley Assignment |
| Check Embedded Header | Galley Assignment |
| Check Class | Galley Assignment |
| Check Display Separation | Galley Assignment |
| Phase 3 | |
| Area Sort | Preamble |
| Class Sort | Preamble |
| Galley Shadow | Galley Assignment |
| Galley Allocation | Galley Assignment |
| Check Embedded Header | Galley Assignment |
| Check Class | Galley Assignment |
| Check Display Separation | Galley Assignment |
| Check Listing Stretch | Galley Assignment |
| Move Display (to bottom of page) | Postamble |
| Balance Listing | Postamble |
| Balance Last Page | Postamble. |

Phase 1 of this "best fit" sorting operation begins with a Preamble part Area Sort. The Area Sort is used to sort all the display ads within a given class by descending area size. The classes are defined by header listings. In this first phase all the display ads are moved as close as possible to their header listings.

Upon completion of the Area sort the Phase 1 operation enters into the Galley Assignment part with the execution of the Galley Allocation sort so as to preliminarily assign each item to the first available location. Since there is a great variety in the types of items and their page locations, a number of Check sub-routines must be performed as part of the Galley Allocation sort.

The Check Embedded Header sub-routine begins the process and ensures that the header listings are not located so that they precede display ads of a previous class.

This is followed by the Check Class sub-routine which ensures that when a class continues from one spread to the next, there is sufficient area on the first spread for a class continuation message. The area required for such a message is determined by the layout parameters.

The Check Class sub-routine is followed By the Check Shadow sub-routine which checks to see that listings are not located in the shadow of a display ad.

The Phase 1 Galley Allocation sort is thereafter completed by the Check Display Separation Sub-routine which determines whether the display ads of any one class are placed in columns occupied by display ads of another class. The misplaced display ads are moved to columns containing the appropriate class unless such placement would result in excessive waste of space.

In Phase 2 sorting operations are performed on the listings as paginated in Phase 1. The Preamble of this second phase begins with an Area Sort wherein the display items are again sorted within each class by descending order and are moved as close as possible to their header listing.

The Preamble continues and ends in Phase 2 with a Class Sort, which given the relative order of the displays as they emerge from the Area Sort, sorts the displays as much as possible into an "L" shape. Since the display ads must remain within the class boundaries it is not always possible to achieve the "L" shape.

The Galley Assignment part of Phase 2 begins with a Galley Shadow sort which ensures that listing items are not located within the shadow of a display ad. Since the display ads have already been sorted in descending size order, the available space for listings in the columns may be reduced by this sort.

The Phase 2 Galley Assignment part continues with the Galley Allocation sort and the sequential sub-routines of Check Embedded Header, Check Class and Check Display Separation. This sort reassigns all of the items and finishes Phase 2.

Phase 3 again performs sorting operations on the results of the sorting operations of Phase 2. This phase begins with a Preamble part consisting of an Area Sort and a Class Sort and continues with the Galley Assignment part which begins with a Galley Shadow sort.

The Galley Shadow sort is followed by the Galley Allocation sort and its sub-routines. The sub-routines that are used in Phase 3 are Check Embedded Header, Check Class, Check Display Separation and the Check Listing Stretch sub-routines. The Galley Allocation part of this final phase contains the additional Check Listing Stretch sub-routine for the placement of displays.

The Check Listing Stretch sub-routine positions or stretches listing material over all of the pages occupied by displays of the same class. This check procedure avoids an excessive occurrence of pages with display material only as often occurs in a class with a large amount of display material and a small amount of listing material.

Phase 3 concludes with a three sort Postamble. It begins with a Move Displays to Bottom of Page sort which moves display ads to the bottom of the page without changing their relative order. This is followed by a Balance Listings sort which redistributes listing material over adjacent columns in to give a smoother appearance. The Postamble and the entire pagination procedure ends with a Balance Last page sort which ensures that each column of the last page contains approximately the same amount of material.

While the above description illustrates a number of embodiments of the invention, other embodiments which utilize the processes and systems of the invention can be constructed.

We claim:

1. A system for automatically paginating a printed directory having at least one directory page containing book items including reference listings, display advertisements and filler text of different sizes, shapes and permitted positions on the directory page, the system comprising a processing unit, a memory, input means for entering data including pre-formatted host-dependent data from which the type, height and width of each book item can be extracted, means for storing data, printing means, and a computer program containing a data formatting, a pre-pagination, a pagination, a cross-reference and a post-pagination module;

the data formatting module comprising a utility program which converts pre-formatted host-dependent data into input data which input data specifies the type, height and width of each book item;

the pre-pagination module comprising a program which creates intermediate data files from the input data generated by the data formatting module which intermediate data files contain an abbreviated form of the input data, identification codes and size information on the display advertisements, and data on vertical separation between the book items and body height of the book items the pagination module comprising a program which assigns a page location for each book item in the intermediate files generated by the pre-pagination module by performing a series of sorting operations on the intermediate data files based on stored pagination parameters so as to produce a paginated tabulated data file;

the cross-referencing module comprising a program which determines the relationships between the display advertisements and corresponding reference listings in the paginated tabulated data file using the intermediate data files; and the post-pagination module comprising a program which prepares a final book layout of the printed directory using the intermediate data files by associating all of the paginated book items generated by the pagination module with their corresponding textual and graphic content;

wherein the processor executes intermediate data files to produce the final book layout of the printed directory and prints the directory.

2. The system of claim 1 wherein the pagination module program further comprises a galley assignment phase in which all book items are assigned a galley location.

3. The system of claim 1 wherein the pagination module comprises a program that sequentially executes a preamble phase which sorts display advertisements, a galley assignment phase which assigns each book item a galley location, and a postamble phase which performs sorting operations to improve the layout of the printed page.

4. The system of claim 3, wherein the preamble phase performs one or more sorting operations based on the parameters of area size, width, class or page position.

* * * * *